(12) United States Patent
Toney

(10) Patent No.: US 7,871,480 B1
(45) Date of Patent: Jan. 18, 2011

(54) APPARATUS AND METHOD FOR MAKING MOTOR VEHICLE AIR BAGS, AND AIR BAGS MADE BY SAME

(76) Inventor: Wayne H. Toney, 704 Stone Ridge Rd., Greer, SC (US) 29650

(*) Notice: Subject to any disclaimer, the term of this patent is extended or adjusted under 35 U.S.C. 154(b) by 864 days.

(21) Appl. No.: 10/301,490

(22) Filed: Nov. 21, 2002

Related U.S. Application Data

(60) Provisional application No. 60/331,880, filed on Nov. 21, 2001.

(51) Int. Cl.
*B32B 37/00* (2006.01)

(52) U.S. Cl. .............. 156/73.1; 156/93; 156/272.2; 156/290; 156/308.4

(58) Field of Classification Search .............. 156/73.1, 156/93, 272.2, 290, 308.2, 308.4, 379.6, 156/580.1, 580.2, 583.1
See application file for complete search history.

(56) References Cited

U.S. PATENT DOCUMENTS

| | | | |
|---|---|---|---|
| 3,477,397 A | 11/1969 | Hawley | |
| 3,892,425 A | 7/1975 | Sakairi et al. | |
| 3,966,597 A * | 6/1976 | Omori et al. ............... | 210/693 |
| 4,273,059 A | 6/1981 | Kamal | |
| 4,434,731 A | 3/1984 | Beisler | |
| 4,512,269 A | 4/1985 | Bowditch | |
| 4,590,873 A | 5/1986 | Ulmen | |
| 4,601,249 A | 7/1986 | Frye | |
| 4,624,198 A | 11/1986 | Beam et al. | |
| 4,685,309 A | 8/1987 | Behr | |
| 4,685,408 A | 8/1987 | Frye | |
| 4,893,574 A | 1/1990 | O'Neal et al. | |
| 5,010,663 A | 4/1991 | Thornton et al. | |
| 5,018,462 A | 5/1991 | Brocklehurst | |
| 5,110,666 A | 5/1992 | Menzel et al. | |
| 5,114,180 A | 5/1992 | Kami et al. | |
| 5,123,987 A * | 6/1992 | Mattia ..................... | 156/234 |
| 5,131,434 A | 7/1992 | Krummheuer et al. | |
| 5,213,363 A | 5/1993 | Fukumori et al. | |
| 5,226,378 A | 7/1993 | Suzuki et al. | |
| 5,259,645 A | 11/1993 | Hirabayashi et al. | |
| 5,277,966 A | 1/1994 | Nakayama et al. | |
| 5,296,278 A | 3/1994 | Nishimura et al. | |
| 5,302,432 A | 4/1994 | Shigeta et al. | |

(Continued)

FOREIGN PATENT DOCUMENTS

GB 2241207 8/1991

*Primary Examiner*—James Sells
(74) *Attorney, Agent, or Firm*—Dority & Manning, P.A.

(57) ABSTRACT

An apparatus and method of manufacturing a plurality of air bags for use in a motor vehicle, and air bags made by same. First and second fabric layers of a type of fabric suitable for use in a vehicle air bag are fed into a seaming station. At the seaming station, the fabric layers are seamed together according to a predetermined seaming pattern so as to produce a composite textile structure defining a plurality of individual air bags to be cut therefrom. Depending on the application, the seaming may be accomplished by stitching or welding. If the fabric layers are not precoated, a suitable coating material may then be applied to both outer surfaces of the composite textile structure so as to render the air bags substantially impermeable to passage of air. Finally, the plurality of individual air bags are cut from the composite textile structure.

10 Claims, 5 Drawing Sheets

U.S. PATENT DOCUMENTS

| | | | |
|---|---|---|---|
| 5,333,561 A | 8/1994 | Katou | |
| 5,336,538 A | 8/1994 | Kitamura | |
| 5,441,798 A | 8/1995 | Nishimura et al. | |
| 5,566,434 A | 10/1996 | Beasley | |
| 5,630,261 A | 5/1997 | Beasley, Jr. | |
| 5,651,395 A | 7/1997 | Graham et al. | |
| 5,671,935 A | 9/1997 | Berger et al. | |
| 5,685,347 A | 11/1997 | Graham et al. | |
| 5,707,711 A | 1/1998 | Kitamura | |
| 5,709,766 A * | 1/1998 | Press et al. | 156/307.3 |
| 5,775,729 A | 7/1998 | Schneider et al. | |
| 5,788,270 A | 8/1998 | HÅland et al. | |
| 5,816,177 A | 10/1998 | Brocklehurst | |
| 5,865,464 A | 2/1999 | Kanuma et al. | |
| 5,881,776 A | 3/1999 | Beasley, Jr. | |
| 5,901,979 A | 5/1999 | Schneider et al. | |
| 6,082,281 A | 7/2000 | Root et al. | |
| 6,189,470 B1 | 2/2001 | Root et al. | |
| 6,239,046 B1 | 5/2001 | Veiga et al. | |
| 6,350,709 B1 | 2/2002 | Veiga | |
| 6,455,449 B1 | 9/2002 | Veiga et al. | |
| 2003/0204227 A1 * | 10/2003 | Ingram et al. | 607/114 |

* cited by examiner

APPARATUS AND METHOD FOR MAKING MOTOR VEHICLE AIR BAGS, AND AIR BAGS MADE BY SAME

This application claims the benefit of application Ser. No. 60/331,880, filed Nov. 21, 2001, which is relied on herein and incorporated herein by reference.

BACKGROUND OF THE INVENTION

The present invention relates generally to air bags of the type utilized in vehicle occupant restraint systems.

Motor vehicles in service today are commonly equipped with air bag systems to supplement the protection provided by seatbelts. These air bag systems utilize at least one folded air bag in fluid communication with a source of inflation gas. A sensor is provided to detect a collision between the vehicle and another object. When such a collision is detected, the sensor actuates the source of inflation gas. As a result, the air bag is rapidly expanded to absorb at least a portion of the collision force that would otherwise have been imparted to the vehicle occupant.

Traditionally, a folded air bag is housed in the steering wheel and expanded when a collision is detected so as to protect the driver. A second air bag has been housed in the dash to protect an occupant located in the front passenger seat. In either of these cases, it is important to design the air bag such that it will quickly deflate after it is inflated by the inflation gas. As a result, the air bag will collapse in a controlled manner as it is impacted by the vehicle occupant. Adequate support will thereby be provided to the vehicle occupant without excessive rebounding.

Due to various considerations, driver side air bags and passenger side air bags have often been constructed of different materials. For example, passenger side air bags have often been constructed of uncoated fabric. Driver side air bags, in contrast, have frequently been constructed of a base fabric woven from either nylon or polyester yarns, which has been coated with an appropriate elastomeric material to reduce permeability. Both passenger side and driver side air bags are often equipped with relatively large vent holes through which the inflation gas is expelled.

In addition to driver side and passenger side air bags, many vehicles are now being equipped with air bags known as side cushions (or "side bags"), side curtains, or both. Side cushions are typically mounted in the outboard side of the seat, whereas side curtains are typically mounted along the roof rail of the vehicle. The side cushions are useful in protecting the middle and lower abdomen region of the occupant's body. Side curtains shield against breaking window glass and offer a degree of protection to the occupant's head.

In contrast to driver side and passenger side air bags, both side cushions and side curtains must remain inflated for relatively lengthy periods of time for continuous protection of the vehicle occupants. This is because the side of the vehicle is vulnerable upon impact to penetration of another vehicle or object. Thus, it is not unusual for vehicle manufacturers to require devices designed for side impact protection to remain inflated for several seconds.

The art has provided three primary techniques for the production of side curtains. The first such technique is to produce a one-piece side curtain using a jacquard loom. The one-piece curtain is coated with a suitable silicone or urethane material to increase its air holding capability. A layer of nonwoven material may be provided on the outside of the curtain nearest the door window to inhibit glass penetration. While these cushions have worked well for their intended purpose, the use of jacquard looms is not without disadvantages.

For example, jacquard looms are generally much more expensive than standard flat weaving equipment. In addition, due to the nature of the jacquard weaving process, a fabric defect often results in loss of the entire bag. There is also difficulty in keeping the bag at the correct dimensions because the dimensions are produced in the weaving process itself. Moreover, it is relatively difficult to coat a one-piece bag.

The second technique used to produce side curtains is the traditional "cut and sew" method. According to this technique, pieces of precoated fabric are cut and sewn together to yield a bag of the desired shape. Because seams are stitched through the coated fabric, however, the traditional cut and sew technique produces holes in the coated fabric that can give rise to air leakage. To alleviate this problem, the seams are often treated with a silicone spray or adhesive to plug the sew holes. In addition, the cut and sew technique is relatively labor intensive, and can produce undesirable variations from bag-to-bag when complex sewing patterns are required.

A third technique involves the production of side curtains using flat fabric coated with urethane. One advantage of urethane-coated fabric is that it can be welded to itself using RF or ultrasonic technology, thus eliminating the need to puncture the coated fabric with a needle as it is seamed. The pieces are still cut as in the cut and sew technique, however, and seamed together using a seaming machine that is operated in a manner similar to a traditional sewing machine.

SUMMARY OF THE INVENTION

The present invention recognizes and addresses the foregoing disadvantages, and others, of prior art constructions and methods.

Accordingly, it is an object of the present invention to provide an improved method of manufacturing an air bag for use in a motor vehicle.

It is a particular object of the present invention to provide an improved method of manufacturing a coated air bag.

It is a particular object of the present invention to provide an improved method of manufacturing an air bag for use in a side impact protection system.

It is also an object of the present invention to provide an apparatus for manufacturing a plurality of air bags.

Some of these objects are achieved by a method of manufacturing a plurality of air bags for use in a motor vehicle. One step of the method involves juxtaposing a first fabric layer and a second fabric layer, with each of the fabric layers being of a type of fabric suitable for use in a vehicle air bag. The first and second fabric layers are then seamed together according to a predetermined seaming pattern so as to produce a composite textile structure defining a plurality of individual air bags (such as side curtain air bags) to be cut therefrom. A further step of the method involves cutting the plurality of individual air bags from the composite textile structure.

It will often be desirable to accomplish the seaming step by stitching. Both sides of the composite textile structure can then be coated with a suitable coating material, such as a silicone coating material. In other cases, the first and second fabric layers may comprise a base fabric precoated with a coating material, such as a urethane coating material. Particularly where a urethane coating material is utilized, the seaming step may be accomplished by RF or ultrasonic welding.

In accordance with preferred methodology, the step of juxtaposing the first and second fabric layers may comprise drawing a predetermined quantity of fabric from both a first fabric roll and a second fabric roll. The first fabric layer (drawn from the first fabric roll) is positioned directly above the second fabric layer (drawn from the second fabric roll) so as to overlie same.

Further objects of the present invention are achieved by a method of manufacturing a plurality of air bags for use in a motor vehicle. One step of the method involves drawing a predetermined quantity of fabric from a first fabric roll and a second fabric roll to respectively yield a first fabric layer juxtaposed to a second fabric layer. The first and second fabric layers are seamed together according to a predetermined seaming pattern so as to produce a composite textile structure defining a plurality of individual air bags to be cut therefrom. The composite textile structure is then rolled onto a take-up roll for storage and transportation.

Still further objects of the present invention are achieved by a vehicle air bag for use with an on-board inflator mechanism. The air bag comprises a first fabric panel and a second fabric panel cut into a predetermined shape of the air bag. In addition, the first and second panels are stitched together about respective peripheries thereof. Outer surfaces of the panels are coated with a layer of coating material so as to be substantially impermeable to passage of air. In addition, the layer of coating material advantageously covers the stitching.

Other objects of the present invention are achieved by an apparatus for producing a composite textile structure defining a plurality of individual air bags to be cut therefrom. The apparatus comprises first and second feed rolls of air bag fabric. A guide mechanism is provided to guide a first fabric layer from the first feed roll and a second fabric layer from the second feed roll into a seaming station, one layer over another. A seaming device, located at the seaming station, is operative to seam the first and second fabric layers together according to a predetermined seaming pattern so as to produce a composite textile structure defining a plurality of individual air bags to be cut therefrom. A take-up roll is also provided on which the composite textile structure is taken up.

In some exemplary embodiments, the seaming device is a sewing machine that seams by stitching. In other cases, the seaming device may be a device that seams by RF or ultrasonic welding. In addition, a drive mechanism may be provided for drawing the fabric layers into the seaming station.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
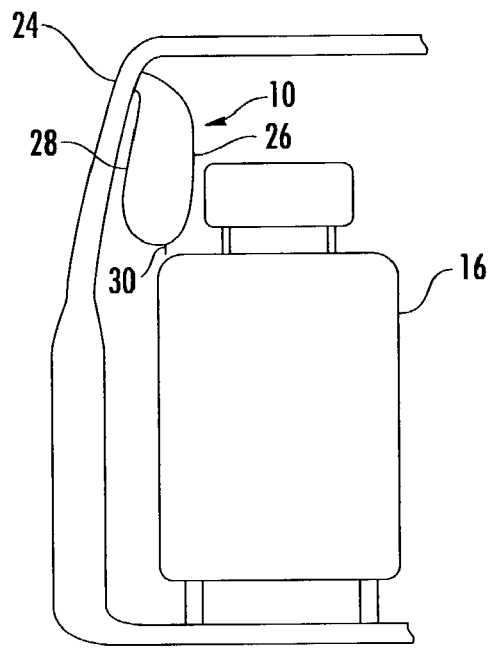
FIG. 1 is a diagrammatic representation of an inflated side curtain depending from the roof rail of a vehicle.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
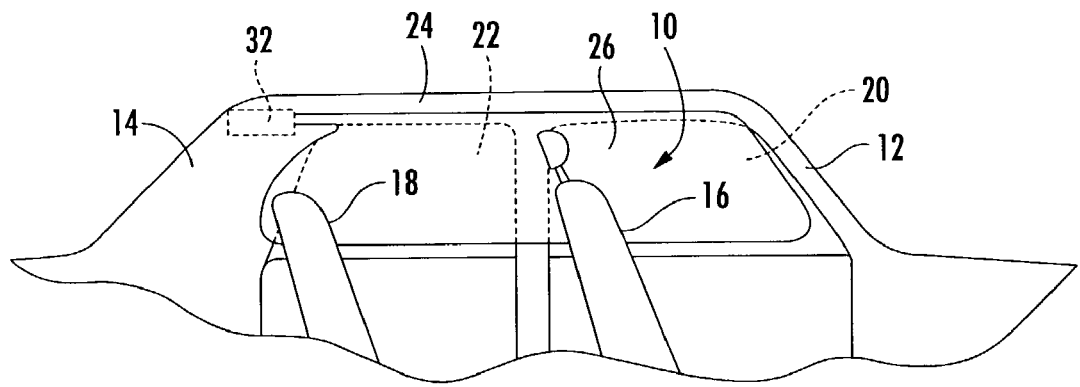
FIG. 2 is a side view from inside the vehicle of the inflated side curtain shown in FIG. 1.

FIGS. 1 and 2 illustrate an inflated side curtain 10 constructed in accordance with the present invention. In this case, side curtain 10 extends substantially the entire distance between front pillar 12 and rear pillar 14 on the vehicle's driver side. As such, side curtain 10 will serve to protect an occupant located in driver's seat 16 as well as a driver's side occupant located in the back seat 18 of the vehicle. Side curtain 10 is particularly useful in protecting the occupants' heads from impact against windows 20 and 22, as well as flying glass from same.

Before it is needed for protection of vehicle occupants, side curtain 10 is folded and stored in the vehicle's "roof rail" 24. Side curtain 10 is constructed of a first fabric panel 26 and a second fabric panel 28 attached along a seam 30. When an impact is detected, side curtain 10 is rapidly inflated by a source 32 of inflation gas with which it is in fluid communication. Specific details regarding the operation of a side impact protection system can be found in U.S. Pat. No. 5,788,270, incorporated herein by reference.

Figure 3:
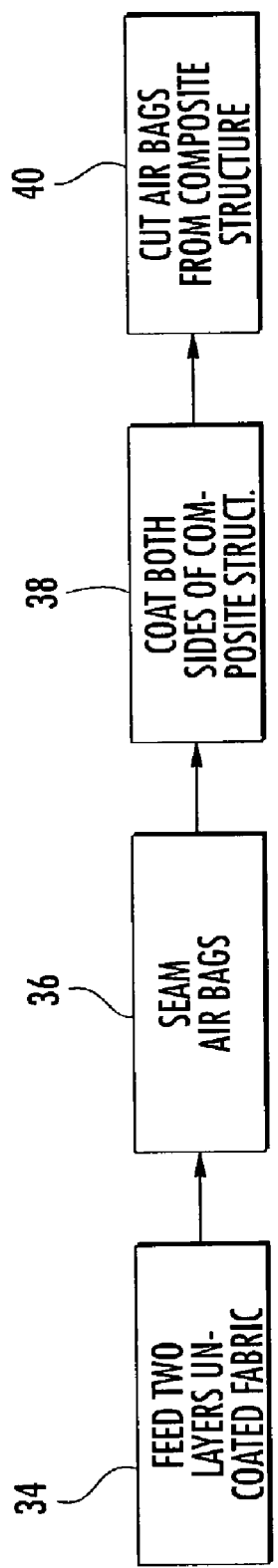
FIGS. 3 and 4 are flow charts illustrating the manner in which air bags may be manufactured in accordance with the present invention.

FIG. 3 shows various steps for producing a side curtain or other coated air bag in accordance with the present invention. As indicated at 34, two layers of uncoated air bag fabric are fed into an appropriate seaming station with one layer over the other. As indicated at 36, the two layers are seamed together at the seaming station according to a predetermined seaming pattern. This produces a composite textile structure defining a plurality of individual air bags eventually to be cut therefrom. As indicated at 38, both sides of the composite textile structure are then coated with a suitable coating material (such as silicone). After coating, the individual air bags may then be cut from the composite textile structure, as indicated at 40.

Figure 4:
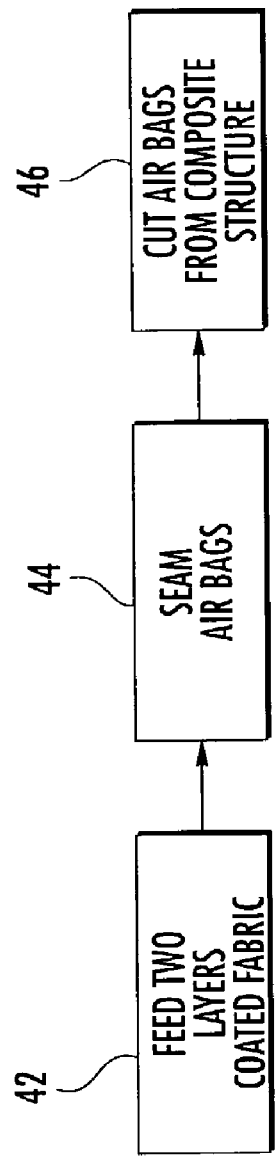

A variation of this methodology for use where the fabric has been precoated with a suitable coating material is shown in FIG. 4. Two layers of precoated air bag fabric are first fed into a seaming station, as indicated at 42. As indicated at 44, the fabric layers are seamed together at the seaming station so as to produce a composite textile structure. The composite textile structure thus defines a plurality of individual air bags to be cut therefrom in the step indicated at 46.

Figure 5:
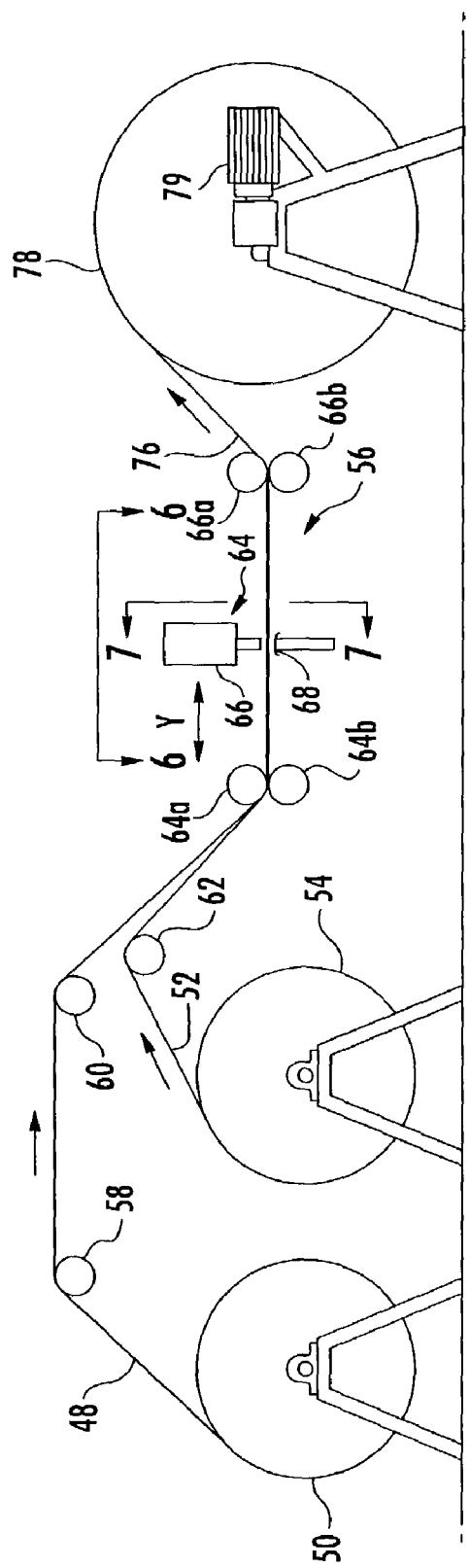
FIG. 5 is a diagrammatic representation of an air bag manufacturing apparatus constructed in accordance with the present invention.

FIG. 5 illustrates an apparatus which may be used to produce the composite textile structure from which the individual air bags are cut. As shown, a first fabric layer 48 is drawn from a first feed roll 50. Similarly, a second fabric layer 52 is drawn from a second feed roll 54. A suitable guide mechanism is provided to guide layers 48 and 52 into a seaming station 56 such that layer 48 will overly layer 52. In this diagrammatic representation, for example, the guide mechanism is shown to include idler rollers 58, 60 and 62. Opposed rollers 64*a-b* and 66*a-b* are provided on each side of the seaming station so as to form respective nips that maintain the two layers taught during the seaming operation.

Figure 6:
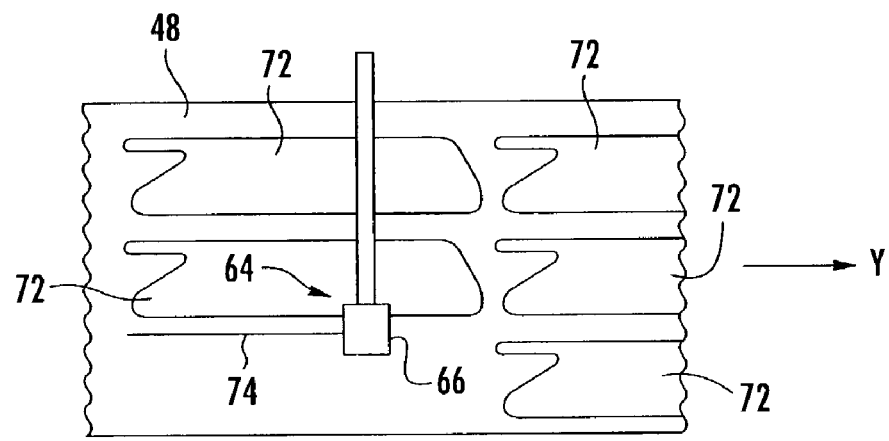
FIG. 6 is a top plan view as taken along line 6-6 of FIG. 5.
Figure 7:
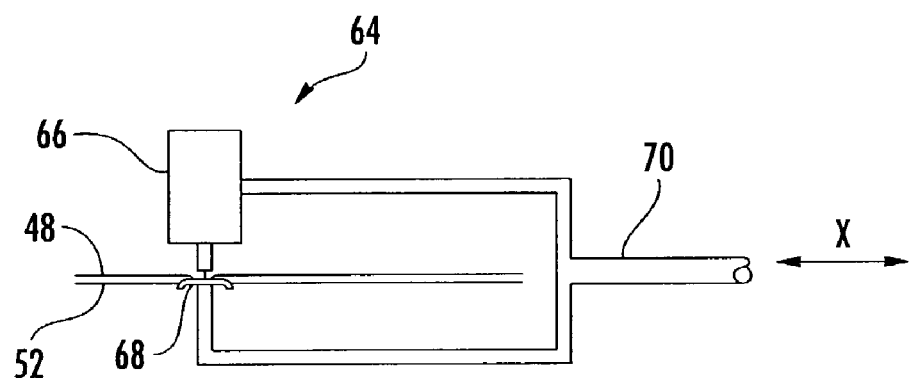
FIG. 7 is a view as taken along line 7-7 of FIG. 5.

Referring now also to FIGS. 6 and 7, certain additional details of the seaming operation can be most easily discussed. In this case, the seaming device is a modified sewing machine 64 having a sewing head 66 located above the two layers of fabric. Sewing head 66 opposes a presser foot 68 located below the fabric layers, as most clearly shown in FIG. 7. Sewing head 66 and presser foot 68 are carried by a mounting structure 70 so as to be moveable in both X (FIG. 7) and Y (FIG. 5) directions. U.S. Pat. No. 6,082,281 to Root, incorporated herein by reference, is believed to show a suitable sewing machine that may be adapted for use in the present invention.

As can be seen most clearly in FIG. 6, sewing machine 64 operates to seam the fabric layers 48 and 52 together according to a predetermined seaming pattern. The composite textile structure thus produced will define a plurality of individual air bags eventually to be cut therefrom. In the illustrated example, sewing machine 64 operates to stitch sets of three side curtain air bags in the X direction per a predetermined unit of length in the Y direction. This can be seen in FIG. 6, where sewing machine 64 is in the process of stitching the final air bag in a set, as shown by the stitch line 74. Depending on the requirements of the particular application, the sewing head can be of a type that produces either a lock stitch or a chain stitch.

While a relatively simple stitching pattern is shown in FIG. 6 for purposes of explanation, it will be appreciated that actual air bags may have a more complicated stitching pattern. For example, side curtain air bags will often be configured having multiple inflatable and noninflatable areas so as to achieve the desired configuration upon inflation. It is contemplated that sewing machine 64 may be programmed so as to produce the desired seaming pattern in a variety of different situations.

Referring again to FIG. 5, the composite textile structure 76 may then be wound onto a takeup roll 78 for transportation and storage. For example, the composite textile structure may be shipped to a coating facility where a silicone or neoprene coating material is applied to its outer surfaces. A suitable drive means, such as gear-motor 79, may be provided to automatically advance the fabric layers through the seaming station.

In this example, it can be seen that the coating material is applied after the stitching instead of before as has often been the case in the past. In other words, the present invention eliminates the need to puncture the coating material with needle holes in order to stitch two panels of the air bag together. Furthermore, this desirable result is achieved without the use of expensive jacquard looms and their attendant disadvantages.

Typically after coating, the individual air bags may then be cut out of the composite textile structure. A variety of devices or techniques may be utilized for cutting the air bags, such as suitable dies and the like. Often, however, it will be preferable to utilize laser cutting equipment, such as that available from Lacent Technologies in Edmonton, Alberta, Canada or Lectra Systems in Bordeaux-Cestas, France.

Figure 8:
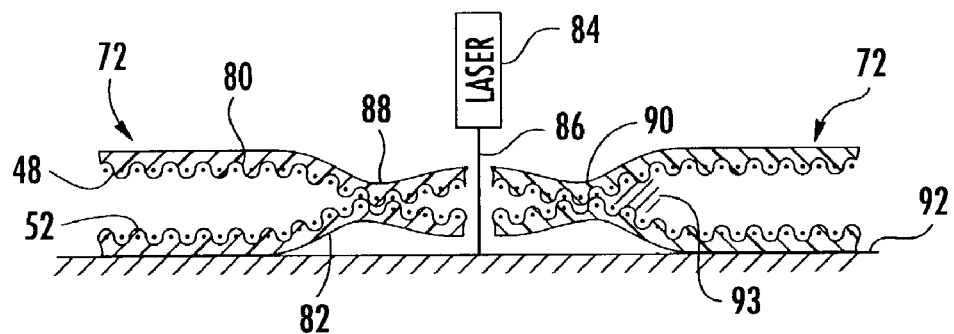
FIG. 8 is a cross sectional view of a portion of a composite textile structure having a plurality of seamed air bags showing a manner in which individual air bags may be cut therefrom.

Referring now to FIG. 8, a top coating layer 80 and a bottom coating layer 82 have been applied to the composite textile structure produced by seaming together first fabric layer 48 and second fabric layer 52. A movable laser head 84 emits a laser beam 86 between the peripheral stitch lines 88 and 90 of a pair of adjacent air bags 72. Typically, a suitable conveyor mechanism 92 is provided to support the composite textile structure during the cutting operation.

A bead 93 of silicone or other material may be applied at the seam to prevent air leakage at this location if the seam stretches during use. Toward this end, the sewing apparatus may be equipped with a small pipe that injects the silicone directly behind the sewing needle. Typically, the pipe will extend from a source of silicone to a location between the two layers ahead of the stitch. The pipe curves around the sewing head and terminates behind the needle so that the bead can be applied at the correct location. The pipe travels with the sewing needle to continuously apply the bead of silicone as the stitch is made.

Figure 9:
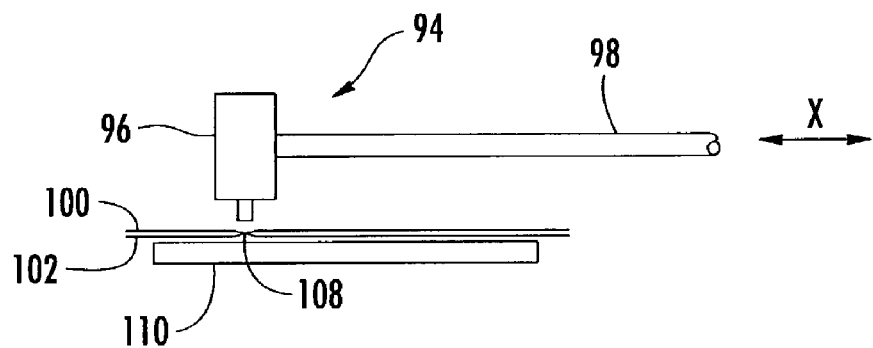
FIG. 9 is a view similar to FIG. 7 illustrating the use of an alternative seaming device.

In addition to a sewing machine, other suitable means of seaming the textile layers into the desired pattern may also be utilized. For example, FIG. 9 illustrates a welding apparatus 94 including a welding head 96 attached to a suitable mounting structure 98. Like sewing machine 64, welding head 96 is movable in both X and Y directions to produce the desired seaming pattern. Depending on the requirements of a particular application, welding head 96 may be either an ultrasonic welding head or a radio frequency (RF) welding head.

Figure 10:
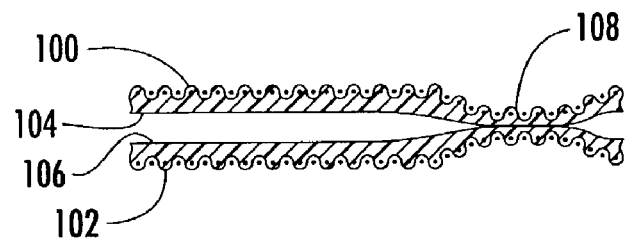
FIG. 10 is a cross-sectional view of a portion of a composite textile structure in which two layers of coated fabric are welded along selected seam lines to yield the plurality of air bags.

Referring now also to FIG. 10, it will often be desirable to precoat the fabric layers with a weldable coating material, such as urethane, where welding is used to seam the fabric layers together. The two precoated fabric layers 100 and 102 are then fed into the seaming station with their coated sides 104 and 106 in face-to-face relationship. The welding head 96 functions to melt the coating material along desired seam lines (such as seam line 108) so as to produce the desired seaming pattern.

Where ultrasonic welding has been utilized in the past to seam together two pieces of fabric material, the welding head has often been opposed to a small disc having a knurled or patterned surface. The fabric layers have been fed through the machine similar to the manner in which an operator feeds two layers of fabric through a traditional sewing machine. Rapid reciprocation of the ultrasonic horn causes the material to weld together according to the pattern on the disc.

While a small disc could be opposed to welding head 96 in a manner similar to presser foot 68 of sewing machine 64, the present invention may simply utilize a large backing plate 110 for this purpose. Located at the seaming station, backing plate 110 defines a knurled pattern on its upper surface similar to the knurled pattern defined on the opposing disc of the prior art. Because of the size of backing plate 110, however, there is no need for it move along with welding head 96. Preferably, backing plate 110 would be formed from a suitable noncorrosive material such as stainless steel.

It can thus be seen that the invention provides an improved apparatus and method for producing vehicle air bags. While presently preferred embodiments of the invention and presently preferred methods of practicing the same have been shown and described, it should be understood that various modifications and variations may be made thereto by those of ordinary skill in the art. In addition, it should be understood that aspects of the various embodiments may be interchanged both in whole or in part. Furthermore, those of ordinary skill in the art will appreciate that the foregoing description is by way of example only and it is not intended to be limitative of the spirit and scope of the invention so further set forth in the following claims.

What is claimed is:

1. A method of manufacturing a plurality of air bags for use in a motor vehicle, said method comprising steps of:

drawing a predetermined quantity of fabric from a first fabric roll and a second fabric roll to respectively yield a first fabric layer juxtaposed to a second fabric layer, said fabric layers being drawn together from a location upstream of a seaming station into said seaming station, each of said fabric layers being of a type suitable for use in a vehicle air bag;

seaming said first and second fabric layers together at said seaming station according to a predetermined seaming pattern so as to produce a composite textile structure defining a plurality of individual air bags to be cut therefrom; and roiling said composite textile structure onto a take-up roll for storage and transportation.

2. A method as set forth in claim 1, wherein said first and second fabric layers are layers of uncoated fabric.

3. A method as set forth in claim 1, wherein both of said first and second fabric layers comprise a base fabric precoated with a coating material.

4. A method as set forth in claim 3, wherein said first fabric layer and said second fabric layer are juxtaposed such that respective coated sides thereof will be face-to-face.

5. A method as set forth in claim 3, wherein said coating material is a silicone coating material.

6. A method as set forth in claim 3, wherein said coating material is a urethane coating material.

7. A method as set forth in claim 1, wherein said seaming step is accomplished by stitching.

8. A method as set forth in claim 1, wherein said seaming step is accomplished by RF welding.

9. A method as set forth in claim 1, wherein said seaming step is accomplished by ultrasonic welding.

10. A method as set forth in claim 1, wherein said individual air bags comprise side curtain air bags.

\* \* \* \* \*